United States Patent [19]

Dolle et al.

[11] 4,106,829
[45] Aug. 15, 1978

[54] PORTABLE MOTOR VEHICLE DRINK COOLER, CADDY AND ARMREST

[76] Inventors: Alvin J. Dolle, 5303 Fredricksburg Rd., Apt. 2, San Antonio, Tex. 78229; Joseph H. Butler, Jr., 3102 Clearfield, San Antonio, Tex. 78230

[21] Appl. No.: 786,388

[22] Filed: Apr. 11, 1977

[51] Int. Cl.² ............................................. A47B 67/02
[52] U.S. Cl. ................................. 312/235 A; 312/244; 312/280; 224/29 D
[58] Field of Search ................ 312/235, 244; 297/194; 206/9 F

[56] References Cited

U.S. PATENT DOCUMENTS

| | | | |
|---|---|---|---|
| 2,692,638 | 10/1954 | Castell | 312/244 |
| 3,304,143 | 2/1967 | Connell | 312/235 R |
| 3,352,616 | 11/1967 | Linger | 312/244 |
| 3,399,938 | 9/1968 | Wallace | 312/244 |

*Primary Examiner*—Casmir A. Nunberg
*Attorney, Agent, or Firm*—Richards, Harris & Medlock

[57] ABSTRACT

The specification discloses a portable accessory dimensioned to rest on the benchseat of a motor vehicle. The accessory is defined by outer side, rear, front and bottom walls. The outer rear wall is contoured to fit the backrest of the benchseat; the outer bottom wall is contoured to fit the seat cushion. Separate inner side, rear, front and bottom walls are thermally insulated from the outer walls to define a storage compartment. A caddy includes a cylindrical cavity for receiving a beverage container which is disposed between the inner and outer front walls. A removable lid is designed to extend slightly into the storage compartment. The upper exposed surface of the lid provides an armrest for a passenger in the motor vehicle.

9 Claims, 4 Drawing Figures

PORTABLE MOTOR VEHICLE DRINK COOLER, CADDY AND ARMREST

FIELD OF THE INVENTION

This invention relates to motor vehicle accessories, and more particularly to a combined cooler, caddy and armrest for use in a motor vehicle.

DISCUSSION OF THE PRIOR ART

In motor vehicles, it is desirable to provide accessories which increase the comfort of passengers, especially the driver, on long motor trips. Accessories such as armrests, storage compartments, food containers and refrigerated or cold storage containers have thus been heretofore designed to meet this need. Often such devices, especially automobile refrigerators and cold storage containers, have been required to be located within the motor vehicle in places inaccessible to the driver or passengers while the vehicle is in motion. Many prior devices have thus been placed in the glove compartment, on the floor of the front or back seat, or in the trunk of the automobile. The comforts provided by these accessories can only be enjoyed when the vehicle is not in motion.

Accessories have been previously developed which can be placed or mounted on the benchseat of an automobile so that they are accessible to the driver and passengers in the automobile while the car is in motion. For example, U.S. Pat. No. 3,118,704, U.S. Pat. No. 3,304,143 and U.S. Pat. No. 3,951,488 describe storage containers which rest on the seat of an automobile and which may also serve as an arm rest or provide other comforts.

A major problem with prior benchseat accessories is that they slide off the seat when the vehicle decelerates. This disadvantage has been met in part by providing accessories which are either permanently attached to the interior of the vehicle or which use an anchor which extends between the seat cushion and the backrest. While these devices do not slide off the benchseat while the vehicle is in motion, such devices cannot be easily removed for cleaning or reprovisioning. Further, previously developed accessory devices have not been completely satisfactory in enabling ease of access, while providing a high degree of thermal insulation.

Accordingly, a need has arisen for a practical and portable motor vehicle accessory which can serve as a storage compartment, cold storage container in addition to an armrest and which rides securely on the benchseat of a motor vehicle.

SUMMARY OF THE INVENTION

The present invention is directed to a portable automobile accessory which rides on the benchseat of a motor vehicle to provide a variety of comforts to the passengers therein, such as a storage compartment, a cold storage container, an armrest and a caddy. By its construction, the present invention is especially well adapted for use on the benchseat of a motor vehicle because it is portable and rides on the benchseat without sliding therefrom when the vehicle decelerates.

In accordance with the present invention, a portable motor vehicle accessory is dimensioned to rest on the benchseat of a motor vehicle. Outer side, rear, front and bottom walls define the accessory. The rear wall is contoured to fit the backrest of the benchseat; the bottom wall is contoured to fit the seat cushion. A storage compartment is defined by separate side, rear, front and bottom inner walls which are substantially thermally insulated from the outer walls by an insulating medium. A caddy, defining two cylindrical compartments for receiving beverage receptacles, is disposed between the inner and outer front walls. A double walled lid enclosing a dead airspace closes the storage compartment to thermally insulate it from the heat of the vehicle interior. The exposed side of the lid provides an armrest for the occupant of the vehicle.

DESCRIPTION OF THE DRAWINGS

For a more complete understanding of the present invention and for further objects and advantages thereof, reference is now made to the following description taken in conjunction with the accompanying drawings in which.

DESCRIPTION OF THE PREFERRED EMBODIMENT

Figure 1:
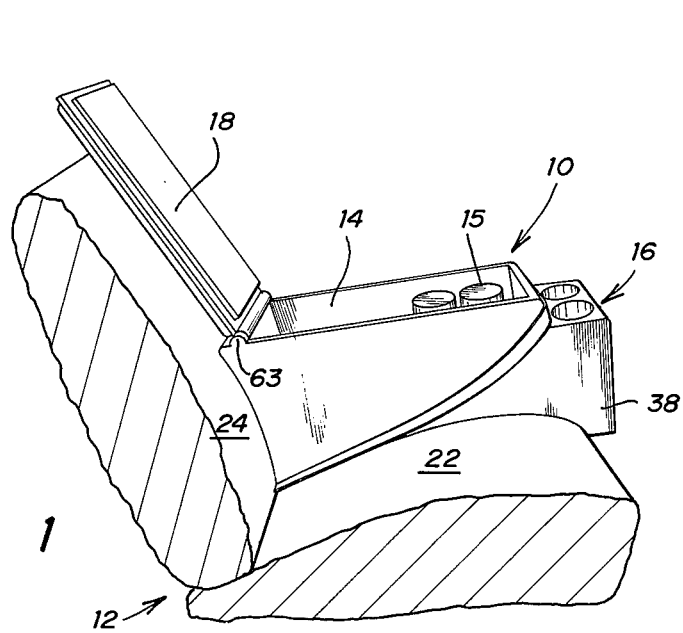
FIG. 1 is a perspective view of the preferred embodiment of the invention.

FIG. 1 illustrates the preferred embodiment of a portable drink cooler 10 placed on the front or rear benchseat 12 of a motor vehicle. Cooler 10 has a waterproof storage compartment 14 for storing beverage containers 15. Ice may also be placed in storage compartment to keep the beverage containers cold as well as other articles such as film, food and the like. Storage compartment 14 is thermally insulated from the outer walls of cooler 10 as will be described in greater detail below. A caddy 16 for holding beverage containers is disposed adjacent storage compartment 14 so that the passenger sitting on the front or rear benchseat can place drink containers therein when not in use. Caddy 16 is convenient for the passenger, making it unnecessary for him to hold the drink container in his hand and is especially advantageous for the driver who needs both hands unencumbered to operate the vehicle.

A removable lid 18, shown hinged to cooler 10 by a gravity hinge, makes it possible to thermally insulate the storage compartment 14 from the interior of the motor vehicle. The top part of lid 18 serves as an armrest as will be hereafter described. As is evident from FIG. 1, and as will be described hereafter in greater detail, the outer walls of the cooler 10 are shaped so as to fit the contour of a seat cushion 22 and a backrest 24 of the benchseat.

Figure 2:
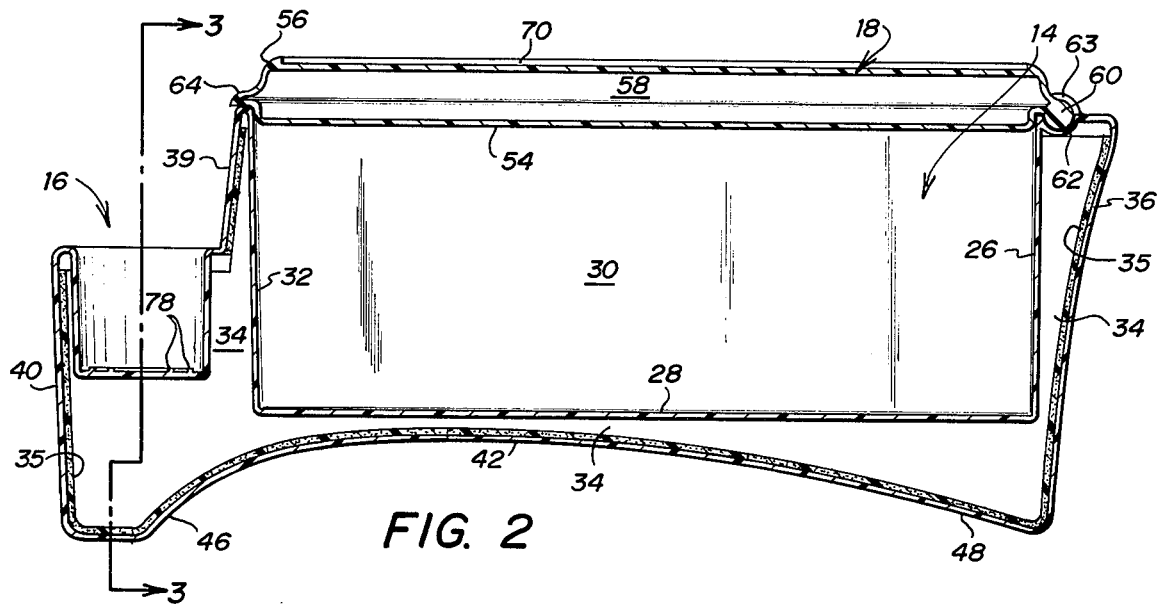
FIG. 2 is a side section view of the preferred embodiment of the invention.

As best shown in FIG. 2, storage compartment 14 is defined by an inner rear wall 26, an inner bottom wall 28, inner side walls 30 and an inner front wall 32. Inner walls 26, 28, 30 and 32 are substantially perpendicular to one another and define waterproof storage compartment 14. Storage compartment 14 is formed inside the exterior of cooler 10 so that the walls of compartment 14 are thermally insulated from the exterior of cooler 10 by an insulating medium 34, interposed therebetween. In the preferred embodiment, insulating medium 34 is a dead-air space containing a thin strip of vacuum formed insulating material 35, similar to the foam insulating material used in air conditioner ducts. Thermally insulated storage compartment 14 is designed essentially for cold storage of film, ice, food, and cold beverages, as well as other articles. When not used as a storage compartment for perishables, storage compartment 14 can be used as a litter container. Because of its insulation, storage container 14 is thermally isolated from the interior heat of the motor vehicle.

The exterior of cooler 10 is defined by an outer rear wall 36, outer side walls 38, an outer front wall 40 and an outer bottom wall 42. Outer rear wall 36 has a shape contoured to fit the backrest 24 of benchseat 12. As previously described, outer rear wall 36 is separated from the inner rear wall 26 of storage compartment 14 by the insulating medium 34. Outer side walls 38 are flat surfaces and thermally isolated by insulating medium 34 from inner side walls 30.

Adjacent the upper half of inner front wall 32 but thermally insulated therefrom by insulating medium 34 is outer face 39 which defines the upper front exterior of cooler 10. Outer face 39 terraces to form caddy 16. The height of outer face 39 is sufficient to permit the wrist of the passenger to rest comfortably on the edge of lid 18, with the finger and hand supported by the terrace defined by caddy 16. Outer face 39 has sufficient surface area for seat belts in the vehicle to be brought around outer side walls 38 as shown in FIG. 1 and interlocked to rest against outer face 39 and caddy 16 to provide additional resistance to slipping when the vehicle decelerates. Outer front wall 40 defines the lower front exterior of cooler 10 and is likewise thermally insulated from inner front wall 32 by insulating medium 34.

Outer bottom wall 42 is of a concave shape contoured to fit the seat cushion 22 of benchseat 12 while the shape of outer bottom wall 42 is designed to rest on the benchseat. An outer bottom wall configuration which conforms to a console placed between bucket seats is likewise contemplated. A pair of forward feet 46 extend from bottom wall 42 and a pair of rear feet 48 extend from bottom wall 42 to to rear wall 36.

Each forward foot 46 joins a rear foot 48 to form a continuous inverted dishshaped outer bottom wall contoured to fit the seat cushion 22 in the benchseat. The insulation provided by insulating medium 34 with insulating material 35 disposed therein effectively prevents the transmission of heat to the storage compartment 14, so that seat cushion 22 is insulated from the temperatures of storage compartment 14. Outer bottom wall 42 is designed to extend along the contour of seat cushion 22 beyond the crest or saddle point where forward foot 46 hugs seat cushion 22.

Figure 3:
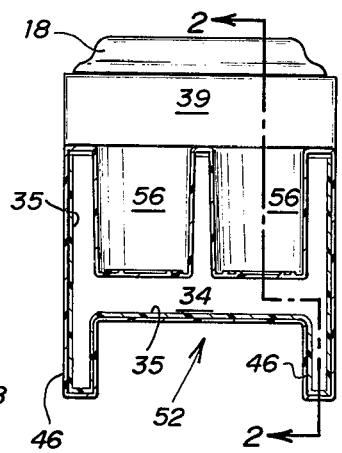
FIG. 3 is a front section view of the preferred embodiment of the invention.

As best shown in FIG. 3, forward feet 46 and rear feet 48 are separated by a niche 52 defined in the outer front wall 40 and the outer rear wall 36. When cooler 10 is placed on a benchseat, outer bottom wall 42 defines the roof of the niche 52 which intersects with the seat cushion 22 at a depth sufficient to provide space for the hand of the passenger to fit therein to facilitate the lifting and transportation of cooler 10 from the vehicle.

Lid 18 is a double walled structure defined by a lower lid 54 and an upper lid 56. Disposed between upper and lower lids 54 and 56 is an insulating medium 58 which facilitates thermal insulation of storage compartment 14 when lid 18 closes it. Lower lid 54 is dimensioned to extend slightly into storage compartment 14 and to fit flush against inner walls 26, 28, 30 and 32 to provide effective insulation from the heat of the vehicle interior. Lower lid 54 joins upper lid 56 near the inner rear wall 26 of the storage compartment to form a gravity hinge member 60.

The gravity hinge is a cylindrical hinge member 60 which rests in a semicircular groove 62 defined between inner rear wall 26 and outer rear wall 36. A flange 63 provides side support for cylindrical hinge member 60. To provide additional structural support for the gravity hinge, flange 63 may define a nipple which is received by an aperture in hinge member 60. The gravity hinge member 60 rotates within groove 62 to allow lid 18 to be swung upward and back, but hinge member 60 may also be lifted out of groove 62 to permit lid 18 to be easily removed so that storage container 14 can be cleaned and reprovisioned. The hinging action of lid 18 is especially important for a passenger or driver of a motor vehicle which is in motion, because it allows the driver to open the storage compartment, retrieve or place an article therein and close the compartment without having to remove the lid from the cooler 10.

A lip 64 is defined by the junction of the lower and upper lids 54 and 56 near the outer face 39 at the front of the cooler. Lip 64 extends just beyond the outer face 39 to provide sufficient area for the finger or fingernail of the passenger to engage the underside of lip 64 to raise the lid. This facilitates the raising of lid 18 which must tightly fit within storage compartment 14 to provide good thermal insulation. The ability to raise lid 18 with ease is especially important for the driver or passenger of a motor vehicle in motion.

Figure 4:
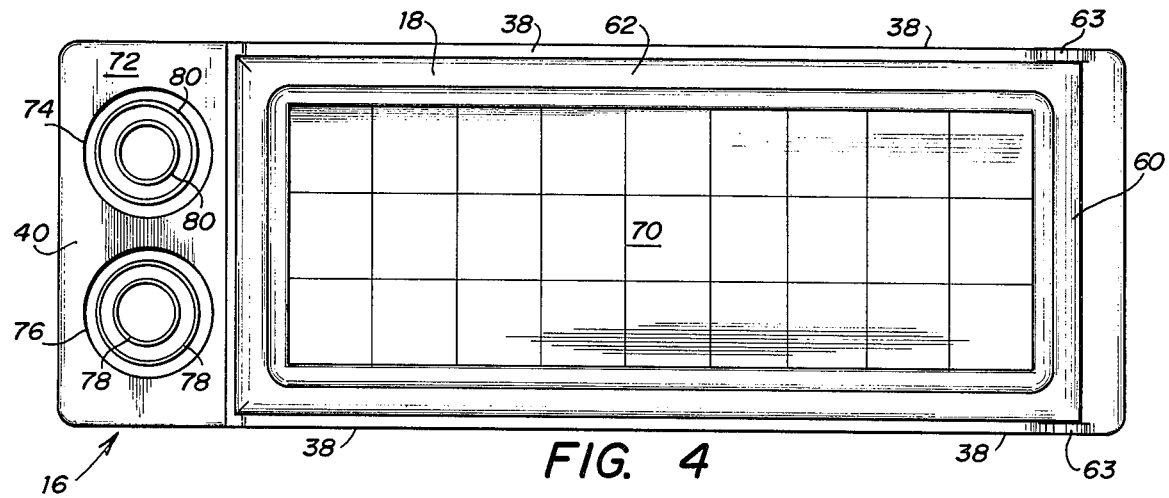
FIG. 4 is a plan view of the preferred embodiment of the invention.

Arm support 70 is disposed slightly above the periphery of upper lid 56 and substantially along its length from lip 64 to gravity hinge 60. The resiliency of seat cushion 22 provides cushioned support for a passenger's arm as it rests against arm support 70. Lid 18 thus functions as an armrest as well as a storage container lid. The structural integrity of lid 18 can be enhanced by cutting a tessellated pattern of grooves in arm support 70 as shown in FIG. 4. Additional cushioning may be obtained by disposing upholstered resilient material along upper lid 56.

Turning now to FIG. 4, caddy 16 is defined where outer face 39 terraces to form a platform 72 which contains two cylindrical cavities 74 and 76 for beverage containers. Cavities 74 and 76 are cylindrically defined and have circumferences sufficient to receive aluminum cans, bottles, cups and glasses. The depth of cavities 74 and 76 is sufficient to provide structural support for these beverage containers, yet permits them to extend sufficiently above platform 72 to be easily grasped by the fingers.

To prevent the accumulation of moisture on the bottom of these beverage containers, resulting either from the condensation of moisture on the container or from the presence of moisture on the container when it is taken from the storage compartment, two concentric circular ridges 78 and 80, about one eighth of an inch high, protrude from the flat bottom of cavities 74 and 76. Two concentric circular grooves are thereby defined between ridges 78 and 80 wherein moisture from the beverage containers can accumulate.

The portable cooler may be constructed from plastic by injection molding the exterior and the inner storage compartment separately. An exemplary material for the cooler exterior is polyethylene, available from Phillips Petroleum or U.S.I. Chemical. A similar polyethylene which meets U.S.D.A. or F.D.A. standards can be used for the storage container 14. Storage container 14 may then be sonically welded to the exterior of cooler 10 to form the complete structure. Lid 18 is formed of similar plastic by a blow molding process using a female dye which is blown against the side of the lid to form the complete lid 18.

The above described invention offers a number of advantages to the operator or passengers of automobiles, airplanes, boats or buses. In addition to providing a readily accessible cold storage compartment, litter compartment, caddy and armrest, the accessory is removable from the vehicle to serve as a food container, ice chest, picnic basket, beer cooler and the like.

Although particular embodiments of the invention have been described herein, it will be understood that the invention is not limited to the embodiments disclosed, but is capable of rearrangement, modification and substitution of parts and elements without departing from the spirit and scope of the invention.

What is claimed is:

1. A portable motor vehicle cooler and armrest accessory dimensioned to rest on the benchseat in a motor vehicle, said accessory comprising:
   outer side, front, rear and bottom walls defining a storage container, said rear wall contoured to fit and conform to the backrest of the benchseat, said bottom wall being contoured in a convex shape to fit and conform to the seat cushion of the benchseat to prevent said container from sliding therefrom while the vehicle is in motion;
   a storage compartment defined by separate inner side, front, rear and bottom walls spaced from said outer walls, said inner walls substantially thermally insulated from said outer walls by an insulating medium;
   a thermally insulated lid enclosing said storage compartment; and
   material disposed substantially along the exposed upper side of said lid to provide an armrest for the occupant of the vehicle.

2. A portable motor vehicle accessory dimensioned to rest in the front seat area of a motor vehicle comprising:
   outer side, rear, front and bottom walls, said bottom wall contoured to fit and conform to a portion of the front seat area of the vehicle;
   a storage compartment defined by separate inner, side, rear, front and bottom walls spaced from said outer walls;
   a caddy disposed intermediate said inner and outer front walls, said caddy having a platform with at least one cavity formed therein to receive a beverage container;
   a lid hinged to said accessory; and
   support means disposed substantially along the exposed portion of said lid to provide an armrest for the vehicle occupant.

3. The accessory as defined in claim 2 wherein said inner walls are substantially thermally insulated from said outer walls by an insulating medium.

4. The accessory as defined in claim 2 wherein said lid has a lip extending beyond said inner wall to facilitate the lifting of said lid by the vehicle occupant.

5. The accessory as defined in claim 2 wherein said lid is removably hinged to said accessory by a gravity hinge including a cylindrical hinge member attached at one end of said lid and removably received by a semicircular groove opening upwardly and formed in said accessory such that said cylindrical hinge member pivots in said groove to open said lid about said hinge while permitting the lid to alternatively be lifted upwardly from said accessory.

6. The accessory as defined in claim 2 wherein said caddy defines two cylindrical cavities dimensioned to receive drink containers, said cavities having sufficient depth to provide support for said containers when said vehicle is in motion and to provide ready access to said containers by the occupant thereof.

7. The accessory as defined in claim 6 wherein the bottom of said cylindrical cavities defines at least two concentric circular ridges to facilitate the drainage of liquid from the bottom of said beverage containers.

8. A portable motor vehicle cooling container dimensioned to rest on the benchseat of a motor vehicle, said container comprising:
   outer side, front, rear and bottom walls defining a container dimensioned to fit on the benchseat in a motor vehicle, said rear wall having substantially the same shape as the contour of the backrest; and
   legs integral with said bottom wall and extending therefrom along the longitudinal length of the container to form a support contoured to fit the shape of the benchseat, said legs supporting the forward portion of said bottom wall above the benchseat to define a first notch between the forward portion of said legs and the bottom wall and benchseat to provide a handle for transporting said container and an air space between the bottom wall and the benchseat, said legs supporting the bottom wall above the benchseat to define a second notch between the rearward portion of said rear legs and the bottom wall and benchseat to provide a second handle for transporting said container and an air space between the bottom wall and the benchseat.

9. A portable automobile accessory dimensioned to fit the bench seat of a motor vehicle, said accessory comprising:
   outer side, front, rear and bottom walls, said rear wall configured to fit the backrest in a motor vehicle, said bottom wall substantially contoured to fit the seat cushion in a motor vehicle;
   four legs integral with said bottom wall, said legs including two front legs adjacent said outer front wall and two rear legs adjacent said outer rear wall, said front legs and rear legs defining a first and second notch therebetween to provide a handle for transporting said accessory;
   separate inner side, front, rear and bottom walls integrally formed with said outer walls and defining a waterproof compartment, said inner walls substantially thermally insulated from said outer walls by an insulating medium;
   a lid removably hinged to said accessory by a gravity hinge, said lid having an upper and a lower lid with an insulating medium disposed therebetween, said upper lid providing support for the arm of a passenger, said lower lid partially extending into said compartment to fit more or less flush against said inner walls, said lid also having a lip extending beyond said inner front wall to enable said lid to be engaged; and
   a caddy disposed intermediate said inner and outer front walls, said caddy defining a platform having two cylindrical cavities dimensioned to receive beverage containers, the bottom of each of said cavities defining two concentric circular ridges to prevent the accumulation of liquid on the bottom of said containers, said caddy also having a face perpendicular to said platform dimensioned to receive interlocked seat belts of the motor vehicle.

* * * * *